US010762241B1

(12) United States Patent
Buckingham et al.

(10) Patent No.: US 10,762,241 B1
(45) Date of Patent: Sep. 1, 2020

(54) THIRD-PARTY PLATFORM FOR TOKENIZATION AND DETOKENIZATION OF NETWORK PACKET DATA

(71) Applicant: United Services Automobile Association (USAA), San Antonio, TX (US)

(72) Inventors: Thomas Bret Buckingham, Fair Oaks Ranch, TX (US); Donald Nathaniel Holloway, III, San Antonio, TX (US); Robert Aaron Ghavidel, Mico, TX (US); Jennifer Nannery, San Antonio, TX (US); Cory Landon Newsom, San Antonio, TX (US); Robert Lawrence, Frisco, TX (US); Huihui Wu, Grapevine, TX (US); Alejandra Valles, El Paso, TX (US)

(73) Assignee: United Services Automobile Associatio (USAA), San Antonio, TX (US)

( * ) Notice: Subject to any disclaimer, the term of this patent is extended or adjusted under 35 U.S.C. 154(b) by 0 days.

(21) Appl. No.: 16/436,108

(22) Filed: Jun. 10, 2019

Related U.S. Application Data (63) Continuation of application No. 15/060,364, filed on Mar. 3, 2016, now Pat. No. 10,318,762.

(Continued)

(51) Int. Cl.
*H04L 29/06* (2006.01)
*G06F 21/62* (2013.01)
*H04L 9/32* (2006.01)
(52) U.S. Cl.
CPC ........ *G06F 21/6254* (2013.01); *H04L 9/3242* (2013.01); *H04L 63/0421* (2013.01)

(58) Field of Classification Search
None
See application file for complete search history.

(56) References Cited

U.S. PATENT DOCUMENTS

| 6,826,405 B2 * | 11/2004 | Doviak | H04L 12/5692 |
| | | | 455/445 |
| 2008/0215842 A1 * | 9/2008 | Kerschbaum | G06F 21/6254 |
| | | | 711/167 |

(Continued)

OTHER PUBLICATIONS

Macharla, Pradeep et al. A QoS Routing Protocol for Delay-Sensitive Applications in Mobile Ad Hoc Networks. 2008 3rd International Conference on Communication Systems Software and Middleware and Workshops (COMSWARE '08). https://ieeexplore.ieee.org/stamp/stamp.jsp?tp=&arnumber=4554506 (Year: 2008).*

(Continued)

*Primary Examiner* — Jeremiah L Avery
(74) *Attorney, Agent, or Firm* — Fletcher Yoder, P.C.

(57) ABSTRACT

Methods, systems, and apparatus, including computer programs encoded on computer storage media, for securing data. One of the methods includes receiving, by a computer system, a network packet for analysis. The method includes determining, by the computer system, to examine the network packet for private data. The method includes identifying, by the computer system, private data in payload of the packet. The method includes encrypting the private data. The method includes storing the encrypted private data in a location separate from the payload. The method also includes obfuscating the private data by adding a reference to the location of the encrypted private data in the payload.

20 Claims, 6 Drawing Sheets

Related U.S. Application Data

(60) Provisional application No. 62/129,444, filed on Mar. 6, 2015, provisional application No. 62/186,174, filed on Jun. 29, 2015.

(56) References Cited

U.S. PATENT DOCUMENTS

| | | | | |
|---|---|---|---|---|
| 2011/0258439 A1* | 10/2011 | Orsini | ............... | H04L 9/085 713/165 |
| 2013/0254538 A1* | 9/2013 | Orsini | ............... | H04L 9/0894 713/165 |
| 2014/0075183 A1* | 3/2014 | Wang | ............... | G16B 30/00 713/150 |
| 2015/0082399 A1* | 3/2015 | Wu | ............... | H04L 9/0897 726/6 |

OTHER PUBLICATIONS

John, Saju P. Novel one hop Virtual group Shared Key Management in Mobile Ad hoc Networks. 2012 12th International Conference on Intelligent Systems Design and Applications (ISDA). https://ieeexplore.ieee.org/stamp/stamp.jsp?tp=&arnumber=6416540 (Year: 2012).*

Meng, Shicong et al. Resource-Aware Application State Monitoring. IEEE Transactions on Parallel and Distributed Systems, vol. 23, Issue: 12. https://ieeexplore.ieee.org/stamp/stamp.jsp?tp=&arnumber=6165268 (Year: 2012).*

* cited by examiner

THIRD-PARTY PLATFORM FOR TOKENIZATION AND DETOKENIZATION OF NETWORK PACKET DATA

CLAIM OF PRIORITY

This application claims priority to U.S. patent application Ser. No. 15/060,364, filed on Mar. 3, 2016, entitled "Third-Party Platform for Tokenization and Detokenization of Data", incorporated herein by reference, which claims priority to U.S. Patent Application No. 62/129,444, filed on Mar. 6, 2015, entitled "Third-Party Platform for Tokenization and Detokenization of Data", incorporated herein by reference and U.S. Patent Application No. 62/186,174, filed on Jun. 29, 2015, entitled "Third-Party Platform for Tokenization and Detokenization Network Packet of Data", incorporated herein by reference.

BACKGROUND

Information privacy, or data privacy (or data protection), can be considered the relationship between collection and dissemination of data, technology, the public expectation of privacy, and the legal and political issues surrounding them.

Privacy concerns exist wherever private information is collected and stored—in digital form or otherwise. Data privacy issues can arise in response to information from a wide range of sources, such as healthcare records, insurance information, financial transactions, biological traits, such as genetic material, residence and geographic records, ethnicity, government identification, tax records, and contact information.

SUMMARY

In general, one innovative aspect of the subject matter described in this specification can be embodied in methods that include the actions of receiving, by a computer system, a network packet for analysis. The methods include the actions of determining to examine the network packet for private data. The methods include the actions of identifying private data in payload of the packet. The methods include the actions of encrypting the private data. The methods include the actions of storing the encrypted private data in a location separate from the payload. The methods also include the actions of obfuscating the private data by adding a reference to the location of the encrypted private data in the payload.

In general, another innovative aspect of the subject matter described in this specification can be embodied in methods that include the actions of receiving a network packet for analysis. The methods includes the actions of determining to examine the network packet for references to private data. The methods include the actions of identifying at least one reference to private data in payload of the packet. The methods include the actions of obtaining encrypted private data based on the at least one reference to private data. The methods include the action of decrypting the private data. The methods include the actions of replacing the tag with the private data in the payload.

Other embodiments of this aspect include corresponding computer systems, apparatus, and computer programs recorded on one or more computer storage devices, each configured to perform the actions of the methods. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The foregoing and other embodiments can each optionally include one or more of the following features, alone or in combination. Identifying the private data may include using a regular expression to identify candidate private data and confirming the candidate private data by performing a secondary validation of the candidate private data. The methods may include the actions of generating a hash-based message authentication code using the private data. Adding the reference to the location of the encrypted private data may include generating a tag, the tag including an indicator of the type of the private data and the hash-based message authentication code and replacing the private data in the received data with the tag. Determining to examine the network packet for private data may include determining to examine the network packet based on at least one of a source address for the network packet and a destination address for the network packet. Determining to examine the network packet for private data may include determining to examine the network packet for references to private data based on at least one of a source address for the network packet and a destination address for the network packet.

BRIEF DESCRIPTION OF THE DRAWINGS

Like reference numbers and designations in the various drawings indicate like elements.

DETAILED DESCRIPTION

Organizations can maintain data about their customers, employees, and affiliates. Some of this data may be considered private. Private data can include, but is not limited to, identifying information, addresses, credit card number, information about financial transactions, biographical information, ethnic information, gender information, health information, data provided by connected devices (such as the Internet of Things, wearables, etc), etc. . . . . It can be advantageous to process and secure private information as it enters the enterprise. It can also be advantageous to process and secure private information automatically as the network packets traverse the enterprise network.

Figure 1:
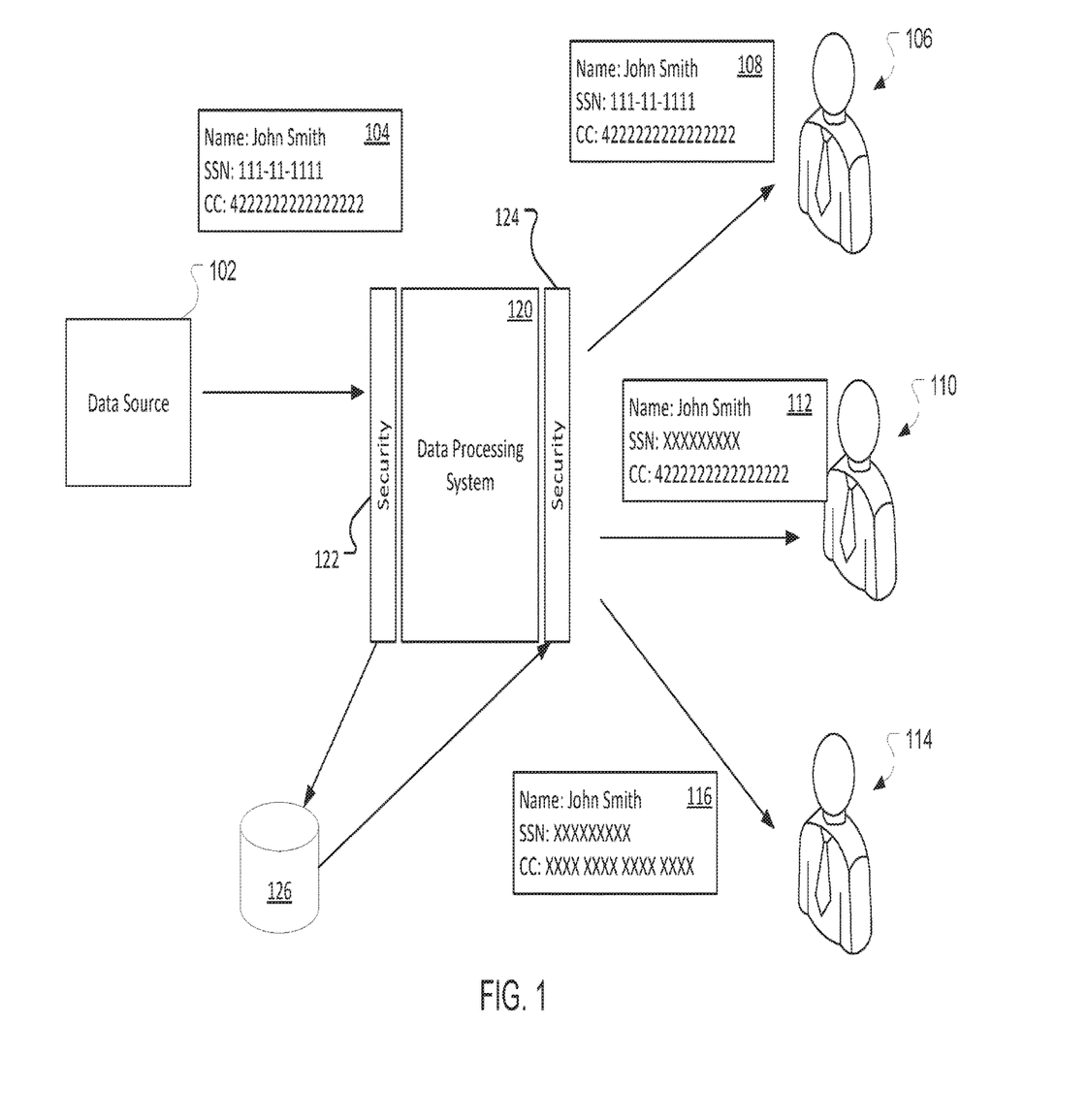
FIG. 1 illustrates an example of a security system for maintaining security of private data.

FIG. 1 illustrates an example of a security system for protecting private data. Data enters the organization from a data source 102. The data source 102 may be, for example, a data feed provided by another organization, information provided by a customer, information provided by an employer or employee, information entered by a customer service representative, or information received in any different manner. In this example, the data source 102 provides a data record 104. The data record includes an individual's name ("John Smith", the individual's social security number ("111-11-1111"), and a credit card number ("4222222222222222"). The data record may also include identifying information or security information derived from on-line devices.

In this example, the security system 122 process the data record prior to the record being delivered to a data process system 120. The security system 122 can, for example, remove private data from the record and store the information security in a secure data store 126. The private data may be replaced by a token that can be used to identify the private data. In general, the process of removing private data from a set of data is referred to, herein, as sanitizing the data.

Different users may have permissions to view different private data. For example, a fraud investigation employee 106 may have permission to view all private data. A sales representative may have permission to view a user's credit card number but may not have permission to view their social security number. A technical support representative may not have permission to view either the social security number or the credit card number of users.

A security system 124 may determine what private data a user is authorized to see when accesses a data from the data processing system 120. Each user may receive customized data based on their security permissions. For example, the security system may replace some of the previously sanitized fields on the data record with the original values. The process of removing tokens identifying private data and replacing at least some of the tokens with the private data is referred to herein as desanitizing the data.

For example, when accessing information about 'John Smith', the fraud investigation employee 106 may receive a record 108 that shows the name, social security number and credit card number. The sales representative 110 may receive a data record 112 that shows the name and the credit card number, but does not include the social security number (as indicated in the figure by a series of X's). The technical support representative 114 may receive a data record 116 that includes the user's name, but does not include either the social security number or the credit card number.

In some implementations, the private data that the user is not authorized to view may be masked (for example, using X's) or may include the token that can be used, by an individual with the appropriate permissions, to retrieve the private data.

Figure 2:
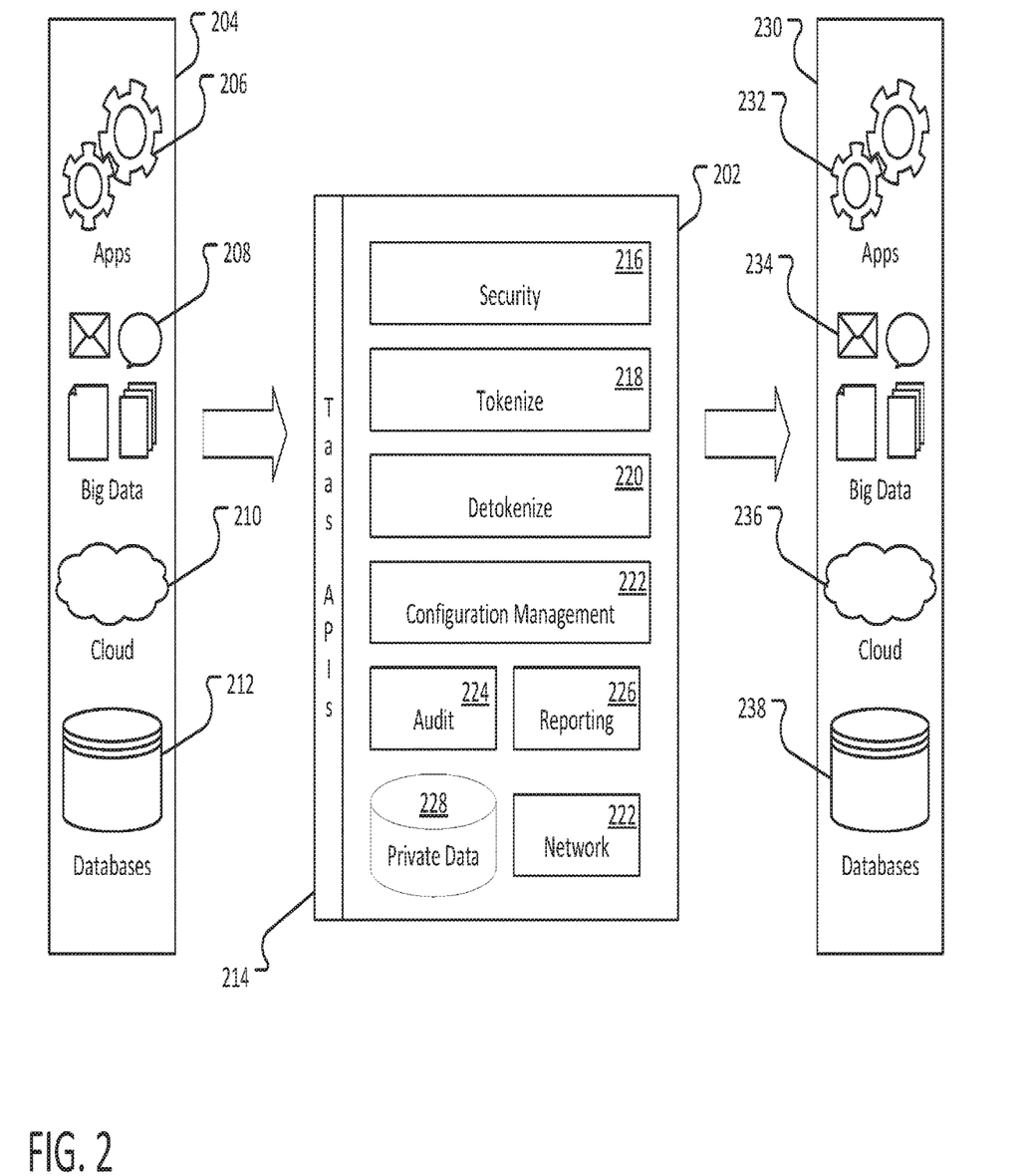
FIG. 2 illustrates an example environment for securing private data.

FIG. 2 illustrates an example environment for securing private data. A data tokenization service 202 can receive data from data sources 204. For example, a system may request that the data tokenization service 202, sanitize or de-sanitize data. In some implementations, the data tokenization service 202 can analyze packets traveling over a network to determine whether to sanitize of desanitize the payload (as discussed further below). Data sources 204 can include applications (apps) 206, BigData sources 208 (data warehouses, large volume data stores containing structured and unstructured data), information provided from a cloud computing systems including data stored in the cloud database (for example, SALESFORCE) 210, and databases 212. In some implementations, data sources can include information provided by drones (for example, images of homes 204 damaged by a natural disaster). The data sources 204 can also include information provided by wearable computing technology or interconnected devices (for example, the Internet of Things which includes devices, vehicles, buildings and other items embedded with electronics, software, sensors, and network connectivity—that enables these objects to collect and exchange data.). Cloud computing systems 210 can involve deploying groups of remote servers and software networks that allow centralized data storage and online access to computer services or resources. Databases 212 can refer to any repository used to store data. For example, object and relational databases. In one example, a relational data source can include an ORACLE database. Other data source can include, but are not limited to flat and structured files from a file system, the files may be either plain text (ASCII or EBSIDIC) or binary. Plain text files usually contain one record per line. There are different conventions for depicting data. In comma-separated values and delimiter-separated values files, fields can be separated by delimiters such as comma or tab characters. In other cases, each field may have a fixed length; short values may be padded with space characters.

The data can be provided to the tokenization service through an Application Programing Interface (API) 214. The tokenization as a service (TAAS) API may support communication using a variety of different protocols, including but not limited to Java Database Connectivity (JDBC), Open Database Connectivity (ODBC), WebService calls (for example, using the SOAP protocol and the Web Service Definition Language (WSDL), SFTP, FTP, RPC, and streaming. Other communication protocols may also be used. In general, JDBC and ODBC are used to receive data from a database or similar data source. SFTP (Secure File Transfer Protocol) and FTP (File Transfer Protocol) are used to receive flat or structured data file. The data can also be provided via streaming. A streaming component in the TAAS API 214 may accept data that is provided to a port or other listener which is configured to receive data.

The data tokenization service 202 may provide a security service 216. Encryption and authorization services may be provided by accessing an of a security service 216. The security service 216 may provide key management service for public key encryption and symmetric key encryption or any other similar algorithm.

The security service 216 may authorize users by accessing an identification repository such as the WINDOW'S ACTIVE DIRECTORY service or a light-weight directory access protocol (LDAP) directory. The identification repository may be a hierarchical distributed database that stores user information, including access permissions.

In some implementations, the data tokenization service 202 may determine whether or not to detokenize a particular piece of private data based on the destination of the data. For example, if the data has a destination of a computer operated by the fraud investigation employee 106 of FIG. 1, then the data tokenization service may determine to detokenize the entire data record. If the data has a destination of a computer operated by the technical support representative 114 of FIG. 1, then the data tokenization service 202 may determine not to desanitize any of the data.

A tokenization component 218 of the tokenization service can receive the data and sanitize it. The token has no extrinsic meaning or value. The token is a reference (i.e. identifier) that maps to the sensitive data through the data tokenization service 202. The mapping from original data to a token uses methods which render tokens infeasible to reverse in the absence of the data tokenization service 202, for example using tokens created from random numbers or a cryptographic hash function.

In one implementation an unsanitized chunk of data can be provided from the source data 204. In general, an unsanitized chunk of data is a chunk of data in which private data has not been tokenized. For example, a data file that includes plain text credit card numbers.

The tokenization component 218 may identify the private data. For example, if the data is structured data, that is, data including both fields and values, the tokenization component 218 may have an identified list of fields that include private data.

Private data may also be identified using regular expressions and validation functions (a function which verifies that the private data identified by the regular expression is most likely actually private data and not merely data that has a similar structure.) In general, a regular expression is a sequence of characters that form a search pattern. Regular expression processors can accept data and a regular expression. The regular expression processors can identify strings or substrings in the data that match the regular expression. For example, the tokenization component 218 can identify credit card numbers in the data by providing the regular expression "^4[0-9]{12}(?:[0-9]{3})?$" (associated with VISA credit card numbers) and the data to a regular expression processor. The regular expression process identifies strings that match the regular expression, for example "4222222222222222," as potentially private data. Similarly, the pattern "^(\d{3}-?\d{2}-?\d{4}|XXX-XX-XXXX)$" can be used to identify a social security number. Other patterns can be created to identify different types of private data.

In some implementations, the tokenization component 218 may identify inappropriate content or adult content to censor. For example, the tokenization component may identify that an image included in a blog, e-mail, or other communication is inappropriate for the sender or recipient and identify the image as private data.

The tokenization component 218 may perform validation tests to increase the likelihood that the potentially private data is private data, and thereby reduce the possibility of false positives. For example, the tokenization component 218 may perform a validation test that includes a checksum of the potential private data "4222222222222222" to determine if the number is actually a potential Visa credit card number. In some implementations, no additional validation test may be performed.

If the potential private data passes the validation test, the private data (here, the credit card number "4222222222222222") is provided to a security component 216. The security component 216 encrypts the private data. For example, the security component 216 may encrypt the private data using a cryptographic key and any cryptographic algorithm, for example, AES-256. The security component 216 may also generate a message authentication code. A message authentication code is a code that can be used to verify and authenticate the data. For example, the security component 216 may generate a keyed-hash message authentication code (HMAC) for the data. A HMAC is a message authentication code involving a cryptographic hash function in combination with a secret cryptographic key. For the purposes of discussion, the examples will be described as using a HMAC; however, other message authentication codes could be used. Any cryptographic hash function can be used, for example, an MD5 hash, SHA-1, SHA-256, or any other conventional hashing algorithm.

The security component 216 can store the encrypted credit card number and the HMAC in a private data store 228. For example, the encrypted credit card number and HMAC may be stored in a relational database or in non-relational database optimized for managing large data sets, such as APACHE HBASE. One advantage of HMACs is that they are less likely to suffer collisions than their underlying hash algorithm, that is the probability that an HMAC that is generated for a first piece of data using, for example, an MD5 hashing algorithm will be the same as an HMAC that is generated for a second piece of data, using the same MD5 hashing algorithm is less than the probability that the MD5 hash of the first piece of data will be the same as the MD5 hash of the second piece of data, as such the HMAC may be identified as a key that is used to identify the record including the HMAC and the encrypted private data.

Figure 3:
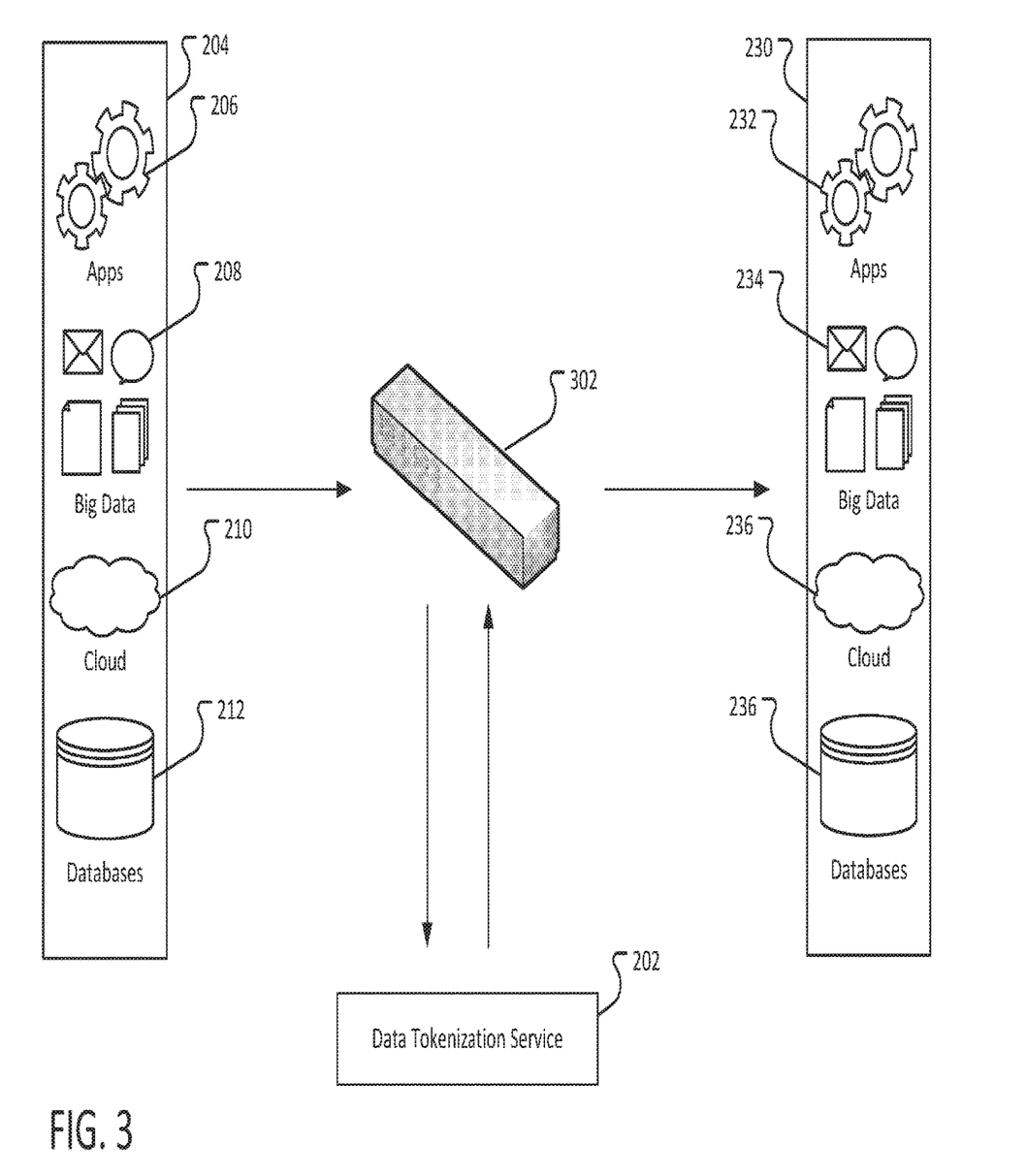
FIG. 3 illustrates an example of securing network communications with a data tokenization service.

The security component 216 provides the HMAC to the tokenize component 218. The tokenize component 218 replaces the private data with a set of tags enclosing the HMAC in a tagged record 306. In this example, the credit card number is replaced with the "<cc>" tag (<cc> and the social security number is replaced with the "<ssn>" tag. During later processing, the HMAC may be extracted from the tagged record and used by the system to later retrieve the encrypted private data.

The private data may be, initially, stored in an in-memory database and synchronized to a persistent database. For example, after synchronization the private data may be stored on a parallel file system. The parallel file system maybe a clustered filed system such as IBM's GENERAL PARALLEL FILE SYSTEM (GPFS). The parallel file system may also include optimization tools to enable efficient operation in a "share nothing" architecture. One example of such optimization tools includes the GPFS File Placement Optimizer (GPFS-FPO).

The sanitized data may be stored and accessed when delivered to data targets 230. As with the data sources, data targets 230 can include applications (apps) 232, BigData 234 (data warehouses, large volume data stores containing structured and unstructured data), information provided from a cloud computing systems including data stored in the cloud database (for example, SALESFORCE) 236, and databases 238.

Systems may request that sanitized data be detokenized. Detokenization is the process by which at least some of the private data removed from unsantized data is restored. A detokenization component 220 receives a request to access the private data using the token. In some implementations, the system may receive a chuck or piece of sanitized data to process, and may identify the tokens in the data. In other implementations, the system may receive a token.

In one implementation, a sanitized chunk of data is provided to the tokenization as a service application protocol interface (API). The user or system requesting the private data may be authenticated and authorized using a security system. In some implementations, the credentials of the user are used to obtain a cryptographic key from a key management system.

In implementation where the tokenization service receive unsantized data, the detokenization service may analyzing the sanitized data chunk for tokens. The private data discovery component may requests a cryptographic key from the security platform. As part of identifying the tokens, or using information stored in the token, the tokenization service may identify a type or class of data.

The token may be used to obtain the tokenized data from the target data source. The tokenized data may be decrypted using the obtained cryptographic key. And provided to the system or user who requested the data be detokenized.

For example, the detokenization component 220 may identify tags in the data. For example, a detokenization component 220 may detect an <ssn> tag and the <cc> tag (among other tags). The detokenization component 220 then interacts with the security component 216. The security component 216 identifies an authorization level associated with the detokenization. The authorization level may be based on the IP address or identity of the user who is to receive the unsanitized data. The authorization engine may also cryptographic keys to decrypt the private data. If the recipient has the appropriate authorization, the detokenization component 220 can decrypt the private data (or have the private data decriypted). The detokenization component replaces the tag (e.g. <ssn> or <cc>) with the decrypted private data.

The data tokenization service can also include a configuration management component 220 that enable an expert user or administrator to customize the function of the data tokenization service 202. The configuration management component 222 can able a user to configure the behavior of the data tokenization service 202. The example, a user may be able to determine regular expressions and validation tests that are used to identify private data. The configuration management component can also enable a user to dictate data sources and data targets which automatic trigger a sanitization/desanitization process, as discussed further below.

The tokenization service can also provide auditing and reporting functions, such the identity of users or systems that requested that sanitized data be detokenized. The system may also provide reports pertaining to the how much data was tokenized, how much data was detokenized, the identity of the system that requested the tokenization. The identity of the users or systems that requested detokenization. Any charges or costs allocated to users of the tokenization as a service system, etc.

The data tokenization service 202 can include a network component that can manage network communications between the data tokenization service 202 and other systems and components. In some implementations, the network component 222 is capable of constructing network communication elements such as packets. As used herein, a network packet is a formatted unit of data carried by a packet-switched network. A packet consists of two kinds of data: control information and user data (also known as payload). The control information provides data the network needs to deliver the user data, for example: source and destination network addresses, error detection codes, and sequencing information. Typically, control information is found in packet headers and trailers, with payload data in between.

FIG. 3 illustrates an example of securing packet level network communications with a data tokenization service 202. In some implementations, data is communicated from a data sources 204 to a data targets 230 using a packet switched network. In general, packet switching is a digital networking communications method that groups all transmitted data into suitably sized blocks, called packet.

Packets transfered from the data sources 204 to the data targets 230 pass through a network switch 302. In general, a network switch is a computer networking device that connects devices together on a computer network. The network switch uses packet switching to receive, process and forward data to the destination device. A network switch can forward data only to one or multiple devices specific devices, rather than broadcasting the same data out of each of its ports.

The network switch 302 can receive packets from the data source 204 addressed to the data target 230. Based on a predetermined criteria (for example, criteria stored in a configuration database) the network switch 302 can redirect the packets to the data tokenization service 302. The criteria can include, for example, the IP address of the data source 204 and the IP address of the data target 230. In some implementations, the network switch 302 may use a configuration table to determine which packets to route to the data tokenization service 202. In some implementations, the network switch 302 may route all packets (other than those from the data tokenization service 202) to the data tokenization service 202.

The data tokenization service 202 can receive the packets from the network switch 302. The data tokenization service 302 can analyze the packet to determine if the packet includes any private information. If the packet includes private information, the data tokenization service can sanitize the payload of the data packet.

The data tokenization service 202 generates a new packet or updates the received packet with the sanitized payload. The data tokenization service can also generate other packet information, such as updating the CRC code and other control information on the packet. Private data may be stored for later recovery as described above.

The data tokenization service 202 sends the sanitized packet to the network switch 302. The network switch 302, in turn, sends the sanitized packet to the data target 230.

Figure 4:
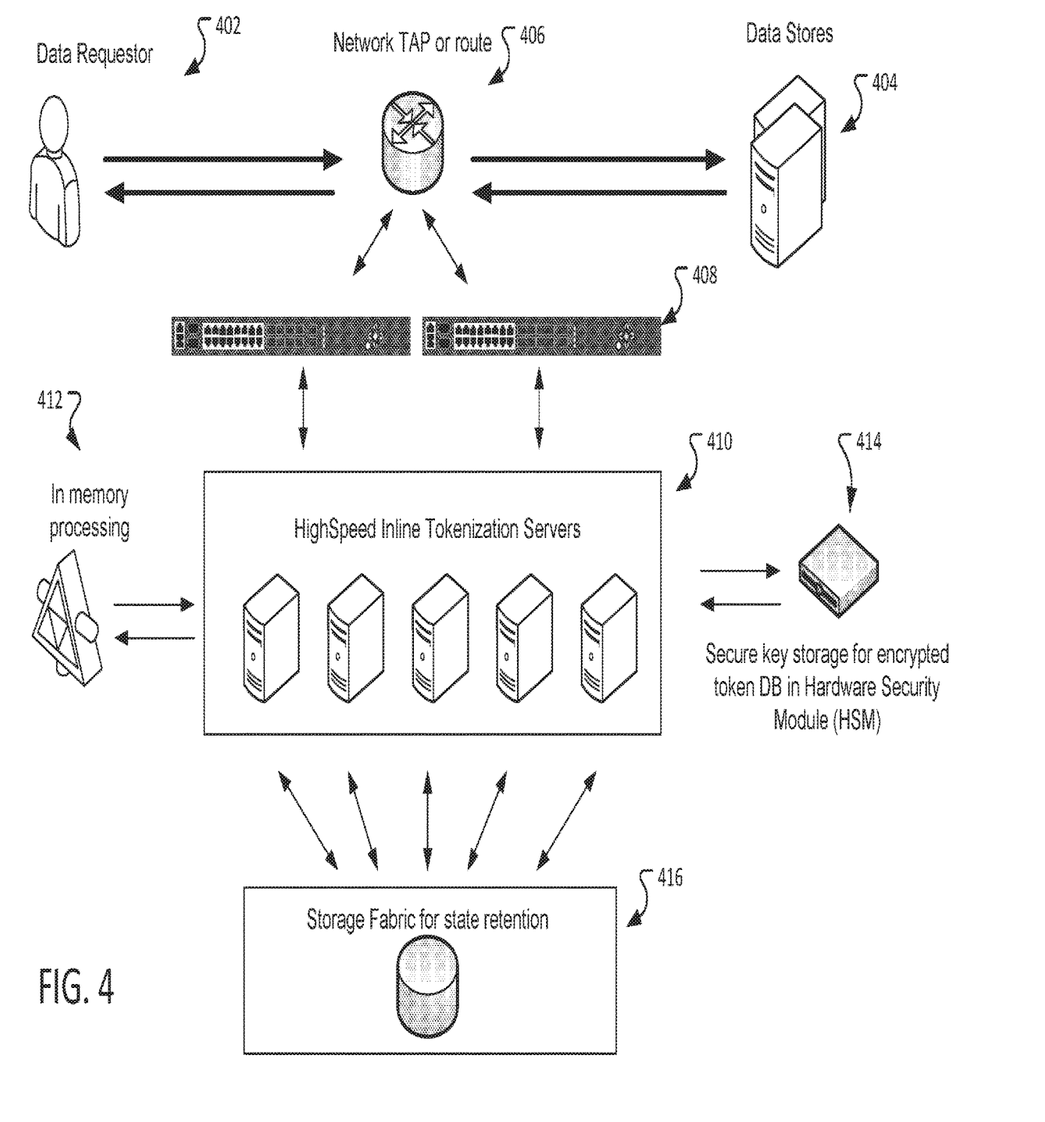
FIG. 4 is a diagram of an exemplary system for securing private data at a packet level.

FIG. 4 is a diagram of an exemplary system for securing private data at a packet level. A user, computer, or computer system may request data from or provide data to a data store. The request to obtain data or store data may be processed by a network tap on the packet switched network. In general, a network tap is a hardware device which provides a way to access the data flowing across a computer network.

The Network tap can monitor the traffic sent from the data requestor to the data store. In some implementations, the network tap can intercept packets.

The intercepted packet can be sent through a switch 408. To a high speed inline tokenization service 410. The high speed inline tokenization service 410 can remove the payload from the packets. The payload may include, for example, unsanitized data to be stored in the data store or sanitized data to be delivered to a user.

The high speed inline tokenization service can sanitize unsanitized data or fully or partially unsanitize sanitized data as described above. In some implementations, the determination which data to add to the sanitized data may be determined based on the identity of the recipient of the data.

The high speed inline tokenization service can be optimized to reduce latency and have scalable performance. For example, latency may be reduced by the tokenization operations being performed in the Random Access Memory 412 of the computer system. The high speed inline tokenization system may use parallel processing techniques to provide scalable throughput. For example, the high speed inline tokenization system may be built on a MAP REDUCE framework.

Encryption keys may be stored in a hardware security module 414. In general, a hardware security module is a physical computing device that safeguards and manages digital keys for strong authentication and provides cryptographic operations (encryption, decryption, etc).

Private data may be persistently stored in a storage access network (SAN). The hardware that connects workstations and servers to storage devices in a SAN is referred to as a "fabric." The SAN fabric 416 enables any-server-to-any-storage device connectivity. In some implementations, the private data may be synchronized between an in-memory database and a persistent data store (e.g., the SAN).

Figure 5:
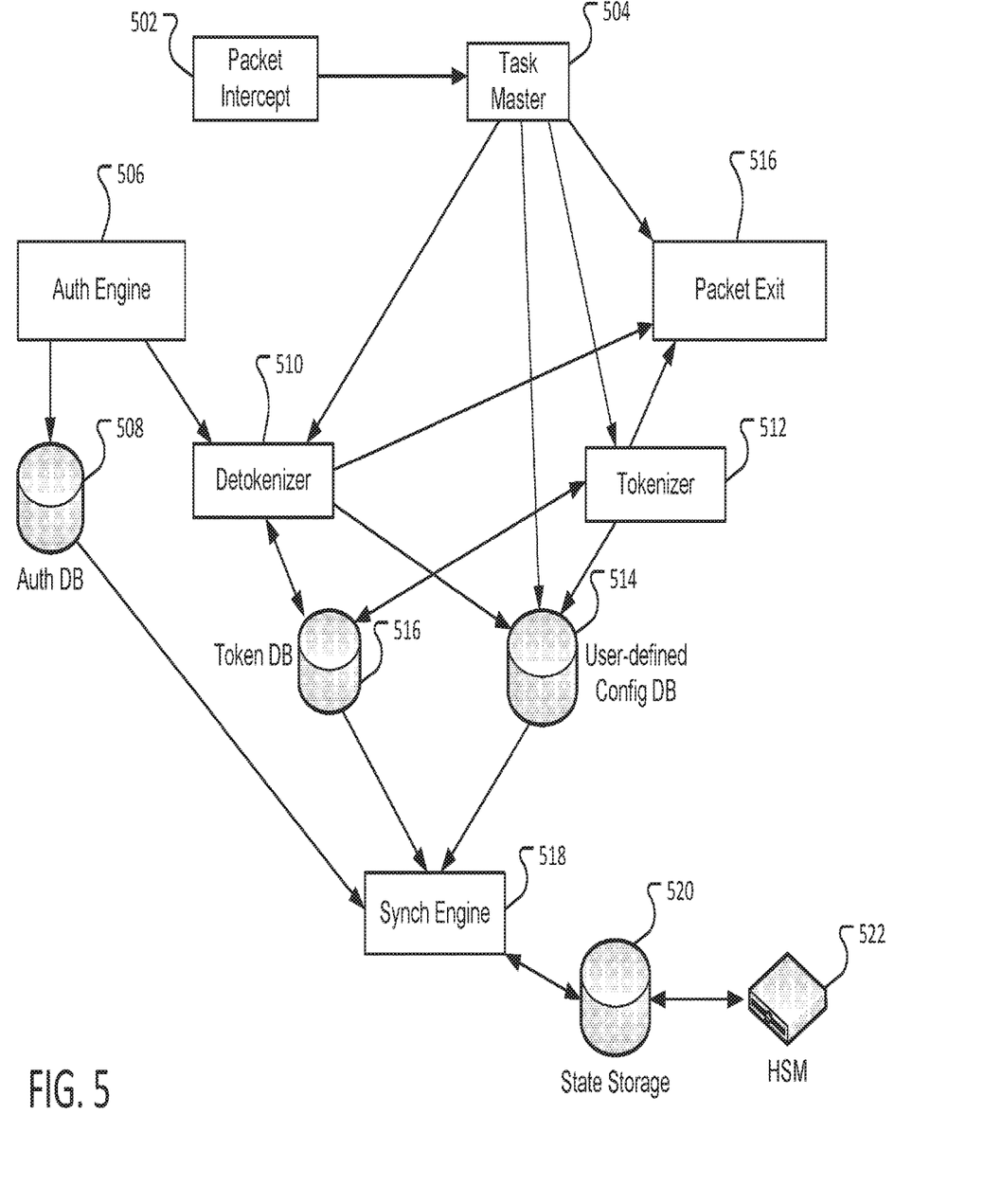
FIG. 5 is a diagram of another exemplary system for securing private data at a packet level.

FIG. 5 is a diagram of another exemplary system for securing private data at a packet level. A packet intercept 502 gathers packet control information and payload data and passes the control and payload data to the task master 504.

A task master 504 reads information from the packet intercept 502 and from user-defined configuration database 514 to determine whether to tokenize, de-tokenize or ignore the packet. The user-defined configuration database 514 may include for example, source and destination IP addresses along with an instruction that identifies how to process packets to and/or from the address. For example, a user may define that all packets from a particular source or directed to a particular destination needs to be sanitized or desanitized. Packets that needs to be sanitized are sent to the tokenizer. Packets that are to be desanitized are send to the detokenizer. Packets that are neither to be sanitized or desanitized are sent to the packet exit 516.

A tokenizer 512 scans the packet payload for items identified as private data in the user-defined configuration database 514. • As described above, the tokenizer 512 can replace the private data with a token that identifies the location of the private data in the token database 516. The tokenizer 512 updates the token database 516 with tokens (private data and identifying token). Once the packet payload has been sanitized (private data replaced by tokens) then the tokenizer 512 sends packet to the packet exit 516.

A detokenizer 510 checks the authorization level from information provided by an authorization engine 506. In some implementations, a user or destination may have an authorization level (for example, a number from 1 to 10). The authorization engine 506 determines the authorization level for the user or destination based on packet intercept information, such as the destination IP address, or other information stored in the header of the packet. The authorization data may be stored in an authorization database 508.

The authorization engine 506 assigns an authorization level number (or otherwise communicates the authorization permissions associated with the de-tokenization request). Each type of private data may be associated with an authorization level (for example, a number from 1 to 10). Users or destinations that have an authorization level below the authorization level of the private data are not permitted to view the private data. Other authorization methods may be used. For example, a user may have a different authorization level for different types of data. A bitmap or similar mechanism may be used to describe custom authorizations.

The detokenizer 510 replaces tokens with real values if authorization level is equal or above required authorization level. After values are replaced, the detokenizer 510 can send new payload to packet exit 516 for reassembly.

If authorization level of the user or destination is lower than the required authorization level then the tokenizer sends the packet to packet exit 516.

As discussed above, in some implementations the detokenizer 510 provides some private data and leaves some of the private data tokenized.

The synchronization engine 518 synchronizes in memory data from the authorization database 508, the token database 516, and the user-defined configuration database 514 with a state storage device 520.

An HSM 522 stores encryption keys and provides access to cryptographic functions.

The packet exit 516 receives packets, either from the task manager directly, from the tokenizer, or from the detokenizer. Packets from the task manager can be sent on to their destination without alteration. Packets from the tokenizer and detokenizer have to be reformed or alter so that the control information is updated to be consistent with the updated payload.

Figure 6:
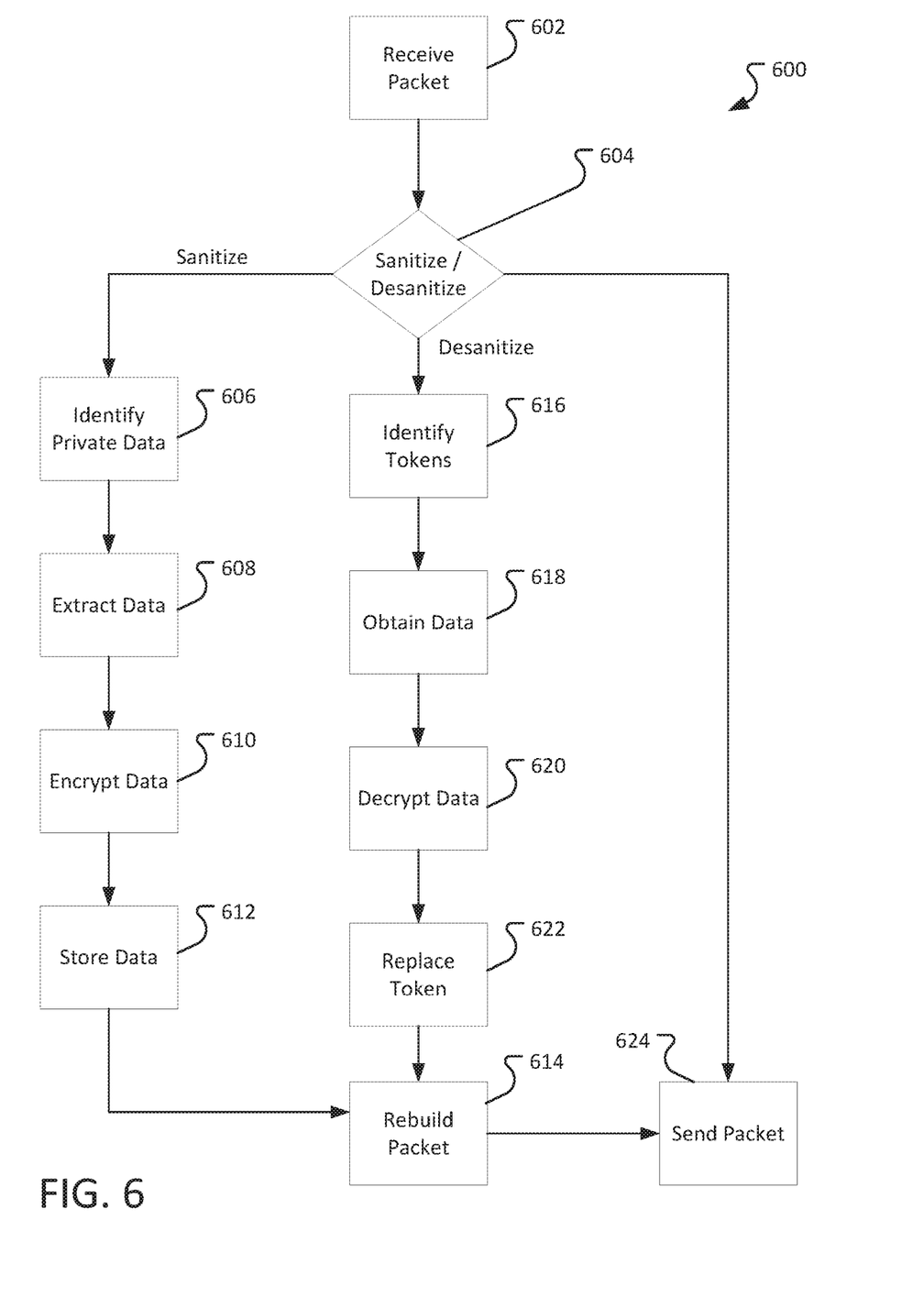
FIG. 6 is a flowchart for an exemplary process for securing private data at a token level.

FIG. 6 is a flowchart for an exemplary process 600 for securing private data at a token level. The process can be performed by a computer system.

Packets are received (602). Packets may be received from a network switch or from a network tap monitoring a network.

A determination is made whether to sanitize, desanitize, or do nothing with the packet (604). The determination may be made based on, for example, the source IP address and the destination IP address of the packet.

If the determination is made to sanitize the packet, private data is identified (606). Private data can be identified as described above with respect to FIGS. 2 and 5.

The private data is extracted (608) from the payload of the packet. The private data can be replaced with a cryptographic hash value of the data stored in a tag, as described above.

The private data is encrypted (610). The private data can be encrypted using a cryptographic key and a cryptographic algorithm, as described above.

The private data is stored (612). The encrypted private data is stored in a database. The encrypted private data may be stored such that the cryptographic hash value may be used to locate the private data.

The packet is rebuilt (614). The packet, with the updated payload is rebuilt. In some implementations, an existing packet can be updated so that the control information is consistent with the new payload. In other implementations, a new packet is created including the new payload.

The new packet is sent (624) to its original destination.

If the determination is made to desanitize the packet, tokens in the payload of the packet are identified (616). For example, tags in the payload of the packet may be identified.

The private data is obtained (618). The private data may be obtained using values stored in the identified tags. In some implementations, not all private data is obtained. For example, a user or destination may not have authority to view all the private data. Instead, only the private data for which the user or destination has permission is obtained.

The private data is decrypted (620). The private data can be decrypted using a cryptographic key and a cryptographic algorithm.

The tokens are replaced with the private data (622). The tokens in the payload are replaced with the decrypted private data.

The packet is rebuilt (614). The packet, with the updated payload is rebuilt. In some implementations, an existing packet can be updated so that the control information is consistent with the new payload. In other implementations, a new packet is created including the new payload.

The new packet is sent (624) to its original destination.

If the determination is made not to do anything to the packet, the original packet is sent (624) to its original destination.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A system, comprising:
a network tap configured to:
intercept a network data packet before provision to an intended target electronic device; and
provide the network data packet to a set of one or more inline tokenizers;
the set of one or more inline tokenizers, configured in parallel to:
receive one or more network data packets;
identify, in the one or more network data packets, sensitive data;
extract the sensitive data from the one or more packets;
store the sensitive data in a storage;
rebuild the one or more network data packets into one or more rebuilt network data packets, replacing the sensitive data with a token that may be used to identify the sensitive data stored in the storage; and
provide the one or more rebuilt network data packets to the intended target electronic device.

2. The system of claim 1, comprising:
a set of one or more detokenizers, configured in parallel to:
rebuild the one or more network data packets into one or more rebuilt network data packets, replacing the sensitive data with a token that may be used to identify the sensitive data stored in the storage; and
provide the one or more rebuilt network data packets to the intended target electronic device.

3. The system of claim 1, wherein the storage comprises a storage fabric.

4. The system of claim 1 wherein the set of inline tokenizers are configured to encrypt the sensitive data after extracting the sensitive data from the one or more packets.

5. The system of claim 1, wherein the token is created from random numbers.

6. The system of claim 1, wherein the token is created from a cryptographic hash.

7. The system of claim 1, wherein the sensitive data is identified using regular expressions that form a corresponding search pattern.

8. The system of claim 7, wherein the sensitive data is identified by searching for strings that match one or more of the regular expressions.

9. The system of claim 7, wherein the corresponding search pattern comprises: a pattern to identify potential social security numbers.

10. The system of claim 7, wherein the corresponding search pattern comprises: a pattern to identify potential credit card numbers.

11. The system of claim 1, wherein the sensitive data comprises content to censor.

12. A tangible, non-transitory, machine-readable medium, comprising machine-readable instructions that, when executed by one or more processors of a machine, cause the machine to:
receive one or more network data packets of intercepted network data;
identify, in the one or more network data packets, sensitive data;
extract the sensitive data from the one or more packets;
store the sensitive data in a storage;
rebuild the one or more network data packets into one or more rebuilt network data packets, replacing the sensitive data with a token that may be used to identify the sensitive data stored in the storage; and
provide the one or more rebuilt network data packets to the intended target electronic device.

13. The machine-readable medium of claim 12, comprising machine-readable instructions that, when executed by the one or more processors of the machine, cause the machine to:
rebuild the one or more network data packets into one or more rebuilt network data packets, replacing the sensitive data with a token that may be used to identify the sensitive data stored in the storage; and
provide the one or more rebuilt network data packets to the intended target electronic device.

14. The machine-readable medium of claim 12, wherein the token is created from random numbers.

15. The machine-readable medium of claim 12, wherein the token is created from a cryptographic hash.

16. The machine-readable medium of claim 12, comprising machine-readable instructions that, when executed by the one or more processors of the machine, cause the machine to run in parallel with a second machine that:
receives a second one or more network data packets of second intercepted network data;
identifies, in the second one or more network data packets, second sensitive data;
extracts the second sensitive data from the second one or more packets;
stores the second sensitive data in a second storage;
rebuilds the second one or more network data packets into one or more second rebuilt network data packets, replacing the second sensitive data with a second token that may be used to identify the second sensitive data stored in the second storage; and
provides the one or more second rebuilt network data packets to a second intended target electronic device.

17. The machine-readable medium of claim 12, wherein the sensitive data is identified using regular expressions that form a corresponding search pattern.

18. A computer-implemented method, comprising:
receive, via the computer, one or more network data packets;
identify, via the computer, in the one or more network data packets, sensitive data;
extract, via the computer, the sensitive data from the one or more packets;
store the sensitive data in a storage;
rebuild, via the computer, the one or more network data packets into one or more rebuilt network data packets, replacing the sensitive data with a token that may be used to identify the sensitive data stored in the storage; and provide, via the computer, the one or more rebuilt network data packets to the intended target electronic device.

19. The computer-implemented method of claim 18, wherein the sensitive data is identified using regular expressions that form a corresponding search pattern.

20. The computer-implemented method of claim 18, wherein the sensitive data comprises content to censor.

* * * * *